United States Patent [19]

Koops et al.

[11] Patent Number: 5,139,307
[45] Date of Patent: Aug. 18, 1992

[54] PANEL ASSEMBLY FOR VEHICLES

[75] Inventors: Roger L. Koops, Hamilton; Daniel R. Athey, Zeeland, both of Mich.

[73] Assignee: Donnelly Corporation, Holland, Mich.

[21] Appl. No.: 773,126

[22] Filed: Oct. 8, 1991

[51] Int. Cl.⁵ .............................................. B60J 1/02
[52] U.S. Cl. ...................................... 296/201; 52/208
[58] Field of Search ................... 296/201, 146; 52/208

[56] References Cited

U.S. PATENT DOCUMENTS

| | | | |
|---|---|---|---|
| 3,843,982 | 10/1974 | Lane et al. | 296/84 |
| 4,072,340 | 2/1978 | Morgan | 296/84 |
| 4,139,234 | 2/1979 | Morgan | 296/84 |
| 4,348,046 | 9/1982 | Ohya | 296/201 |
| 4,363,191 | 2/1982 | Morgan | 49/381 |
| 4,364,595 | 12/1982 | Morgan et al. | 296/84 |
| 4,396,221 | 8/1983 | Morgan et al. | 296/84 |
| 4,502,248 | 3/1985 | Thomas, Jr. et al. | 49/374 |
| 4,700,525 | 10/1987 | Nieboer et al. | 52/208 |
| 4,723,809 | 2/1988 | Kida et al. | 296/201 |
| 4,858,988 | 8/1990 | Morgan et al. | 296/201 |
| 4,953,331 | 4/1990 | Ziegler et al. | 52/208 |

*Primary Examiner*—Robert R. Song
*Attorney, Agent, or Firm*—Price, Heneveld, Cooper, DeWitt & Litton

[57] ABSTRACT

A panel assembly for vehicles forming encapsulated window assembly having improved weather sealing and appearance and reduced wind noise. The assembly includes an elongated, rigid, channel support, a panel-like sheet, and a molded gasket of resinous material such as polyvinylcholoride or reaction injection molded polyurethane extending around the peripheral sheet edge and the outer surface of the channel support to join the sheet and support member into a panel unit. Preferably, the gasket includes at least one recessed pocket receiving a fastener clip to tightly hold the assembly in a vehicle body. The assembly may also include one or more locator members for positioning the assembly with respect to other parts of the vehicle.

38 Claims, 6 Drawing Sheets

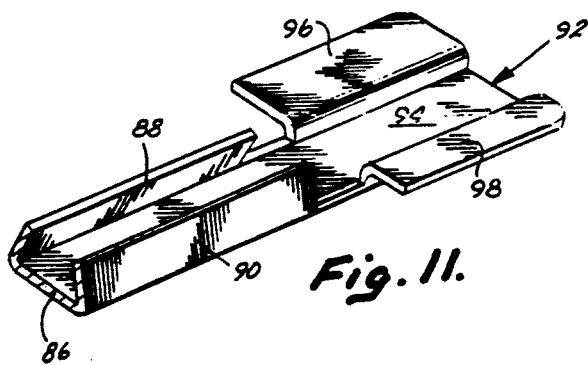
Fig. 11.
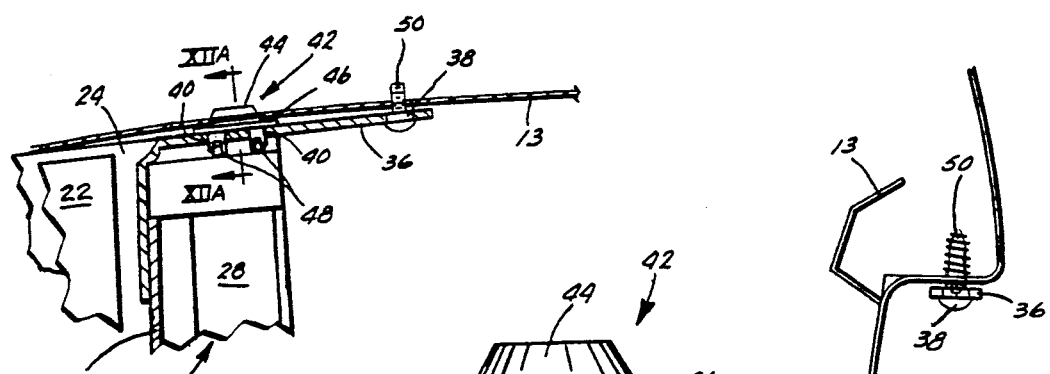
Fig. 12
Fig. 12A.
Fig. 13
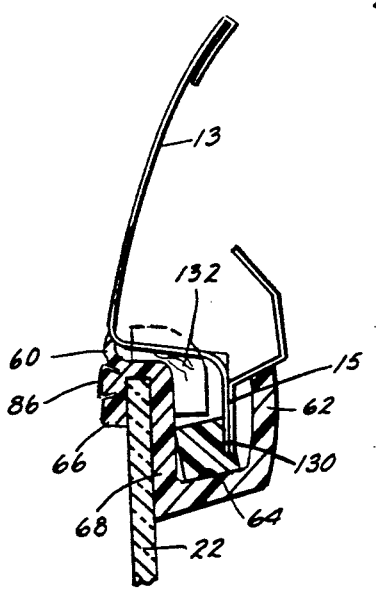
Fig. 14.
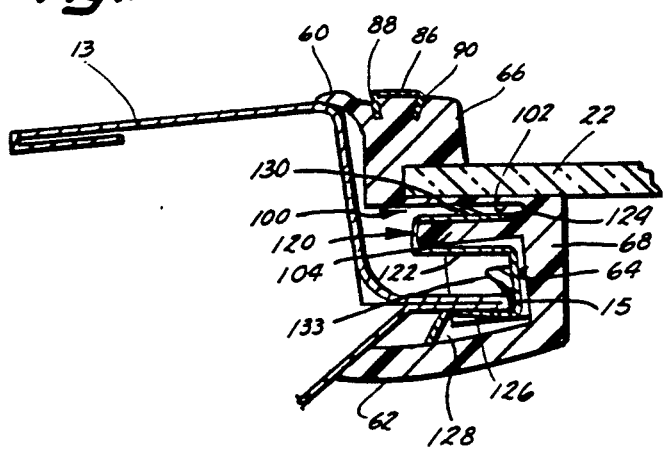
Fig. 15.

PANEL ASSEMBLY FOR VEHICLES

BACKGROUND OF THE INVENTION

This invention relates to a panel assembly for vehicles and, more particularly, to a panel assembly especially adapted for use as a fixed vent window to provide improved weather sealing and appearance and reduced wind noise adjacent a movable window in the vehicle.

In the past, four door sedans and other similar vehicles having movable, roll up windows in the rear doors have provided only limited travel for the windows because of the necessity of configuring the door to extend around the rear wheel well. Large rectangular windows could only be lowered part way because the windows encountered the curved configuration of the door adjacent the wheel well. More recently, however, automobile manufacturers have placed fixed windows known as "vent" windows in the triangular area over the wheel well configuration of the door such that a slightly smaller but rectangular window could be raised and lowered completely in the area forward of the wheel well configuration within the rear door. Typically, such rear fixed vent windows have been built up as composite assemblies from numerous parts during vehicle manufacture. Because of the numerous parts, assemblies have suffered certain styling drawbacks such as inconsistent finish or gloss and a lack of a smooth surface continuity which also tends to create wind noise when the vehicle is in motion. In addition, the multiple parts have allowed water leakage because the parts could not be fitted precisely in all cases.

More recently, fixed vent windows which are molded as a unit have been used. In such windows, an elongated channel is secured by molded material to a sheet of glass configured to the shape of the window area to be closed, the channel also providing a track for the movable window adjacent thereto. Yet, drawbacks have still been experienced with such molded fixed vent windows because of the inability to obtain a tight fit to the vehicle body. This has continued to result in water leakage and undesirable wind noise when the vehicle is in motion. Further, alignment problems with adjacent trim and molding pieces on the vehicle have been experienced along with difficulties in locating and installing such assemblies in the vehicles.

In addition, problems were found during molding these fixed vent windows including inconsistent adhesion of the mold material to the elongated channel member, and "knit" lines or visible seams in the molded material which detracted from the appearance of the finished product.

The present invention was conceived as a solution for these and other problems in panel assemblies for vehicles especially when configured for use as fixed window units.

SUMMARY OF THE INVENTION

Accordingly, the present invention provides a panel assembly for vehicles especially adapted for use in fixed vent windows having improved weather sealing, reduced wind noise, and improved aesthetics for the finished assembly.

In one aspect, the invention is a panel assembly for vehicles including an elongated support member having an outer surface, at least one attachment member for securing the assembly to the vehicle body, a panel-like sheet having a peripheral edge with, one portion of such edge extending along the support member, and a molded gasket extending around the peripheral edge of the sheet, encapsulating the peripheral sheet edge and the outer surface of the support member, and joining the sheet to the support member to form a panel unit. The gasket preferably includes at least one recessed pocket therein and a flange for engaging the vehicle body. A fastener clip is mounted in the pocket for engaging a portion of the vehicle when the assembly is installed to tightly secure the assembly to the vehicle such that wind, noise and water leakage are reduced.

In preferred aspects of the invention, the gasket is generally C-shaped with at least one elongated, flexible, resilient, molded flange for engaging and sealing against the vehicle body. The gasket defines an elongated channel recess around the peripheral sheet edge for receiving a first portion of the vehicle body when installed. A plurality of the recessed pockets are spaced along the gasket adjacent the peripheral sheet edge, one fastener clip being mounted in each of the pockets.

In other aspects, the sheet is a transparent glass panel such that the assembly is a window unit. Preferably, the support member is a rigid channel member having a channel shaped cross section, a closed side and an open side. One edge portion of the sheet extends along the closed side of the support such that the open side of the support opens away from the sheet and provides a space for receiving a track to guide a movable window in the assembled vehicle. Further, the gasket preferably encapsulates the entirety of the outer surface of the rigid channel but terminates at the open side.

In yet other preferred aspects, a locator member may project from the assembly for engaging a portion of the vehicle to locate and position the assembly with respect to the vehicle. Such locator member may be either an upwardly extending tab on a rigid flange secured to the support member or a molded projection extending outwardly from an edge of the molded gasket to locate and position an adjacent trim member in the vehicle. Further, the gasket may include at least one compressible foam strip secured within the elongated channel to enhance weather sealing and reduce wind noise, while an additional molded flange may be provided on the inside surface of the gasket to engage interior trim in the vehicle to further reduce wind noise. In addition, a decorative trim member may be secured to the outside surface of the gasket during molding.

The invention thus provides numerous advantages over prior known fixed window assemblies. The assembly provides a panel unit which is unified and ready for installation as a complete unit and includes fastener clips which tightly secure the assembly to the vehicle body portion easily and without complex adjustments as the window is slid normally into position. During initial installation, an upstanding locator tab on the assembly allows the assembly to be easily initially positioned while final attachment is being made. The assembly includes flexible sealing flanges which engage vehicle body portions to appropriately seal out water and dirt while the overall assembly provides a nearly flush positioning of the sheet-like panel or window with respect to the outside vehicle body. The use of compressible foam strips, sealing flanges, and an inside rib flange together with the fastener clips significantly reduce wind noise in the final assembly. In addition, the assembly provides improved aesthetics since the method avoids knit lines or seams on visible surfaces of the support member, excellent adhesion of the resinous molding material to the support member, and a desirable appearance with consistent finish and gloss along the entirety of the visible surfaces of the assembly.

These and other objects, advantages, purposes and features of the invention will become more apparent from a study of the following description taken in conjunction with the drawings.

BRIEF DESCRIPTION OF THE DRAWINGS

FIG. 11 is a fragmentary, perspective view of a trim strip and tie member used in the panel assembly of the present invention;

FIG. 12 is a sectional view of the top of the panel assembly when installed in a vehicle taken along Plane XII—XII of FIG. 3;

FIG. 12A is a sectional view of the top attachment flange and locator member taken along Plane XIIA—XIIA of FIG. 12.

FIG. 13 is an end view of the top of the panel assembly when installed as shown in FIG. 12;

FIG. 14 is a fragmentary, sectional view of the panel assembly installed in a vehicle taken along Plane XIV—XIV of FIG. 2;

FIG. 15 is a fragmentary, sectional view of the panel assembly installed in a vehicle taken along Plane XV—XV of FIG. 2;

DESCRIPTION OF THE PREFERRED EMBODIMENTS

Figure 1:
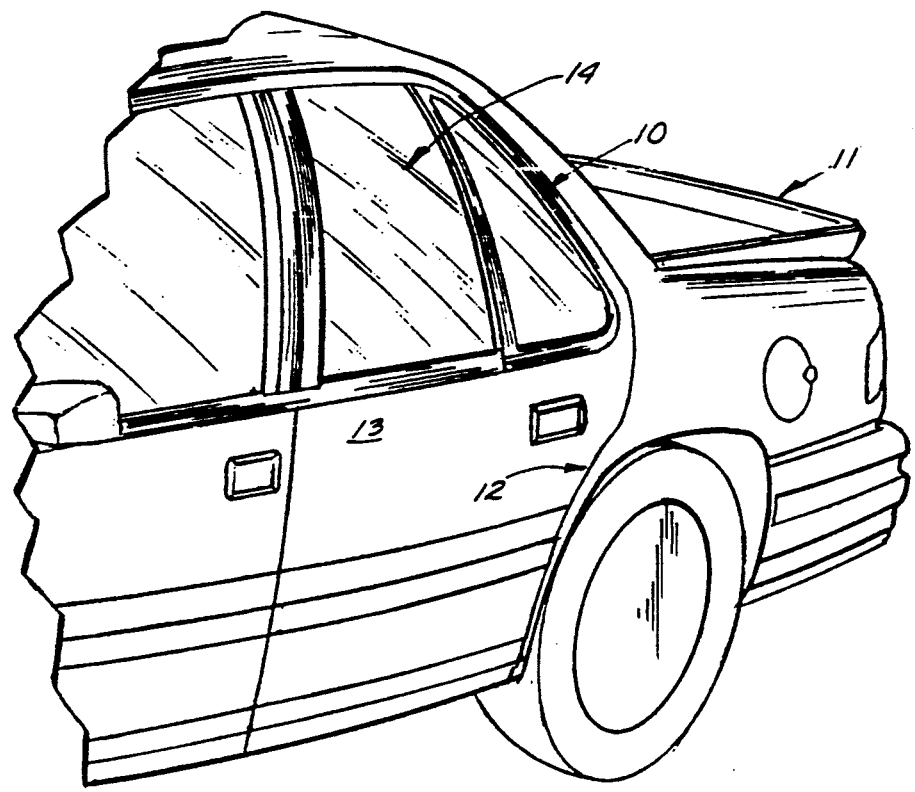
FIG. 1 is a fragmentary, perspective view of the panel assembly of the present invention in the form of a fixed vent window installed in the rear door of a four door sedan automobile.

Referring now to the drawings in greater detail, FIGS. 1-6 illustrate a panel assembly 10 for vehicles in the form of a fixed vent window adapted for permanent installation as a complete unit in the rear portion of the rear door of a four door sedan 11 or other similar vehicle. Four door vehicles of this type of necessity require the rear doors 13 to be curved and configured around the rear wheel well as at 12 in FIG. 1 because of space constraints. In the past, when movable, roll up windows were desired in such doors, the large sized window panel filling the complete window opening of the rear door could be lowered only approximately half way because of the curved configuration 12 of door 13 and the wheel well. However, the present invention provides a panel assembly in the form of an improved fixed vent window which fills in the triangular portion of the rear door to allow a slightly smaller, rectangularly shaped window panel 14 to be completely raised and lowered within the forward portion of the rear door 13 without interference from the wheel well door curvature 12.

As shown in FIGS. 2-6, panel assembly 10 is formed as a complete unit prior to installation in the vehicle 11 and generally includes a rigid channel support member or divider bar 20, a panel-like sheet 22 preferably of transparent or tinted glass, which glass may also be laminated or tempered for extra strength and safety, and a molded gasket or casing 24 extending around and encapsulating the peripheral edge of sheet 22 and securely adhered to the outer surface of channel support 20 to join the sheet 22 to the channel support as an integral panel unit. Alternately, sheet 22 may be a sheet of transparent plastic material or an opaque sheet of plastic, glass or ceramic material if the assembly is adapted for use as a decorative panel instead of being a window unit.

Figure 20:
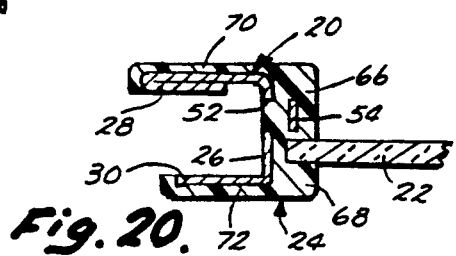
FIG. 20 is a fragmentary, sectional view of the panel assembly taken along Plane XX—XX of FIG. 3.

Preferably, channel support 20 is an elongated, rigid, galvanized steel channel having a rear wall 26 (FIGS. 3, 4, 17 and 18) and a pair of spaced, parallel side walls 28, 30. Channel support 20 could also be formed from other metals or plastics. Side wall 28 preferably has a double thickness for strength and retention of tracks or seals fitted therein when assembled in a vehicle and is formed by bending the metal over and against itself as shown in FIGS. 18 and 20. Channel support 20 typically has a curvature matched to the contour of the vehicle 11 in which it is intended to be installed (FIGS. 3 and 4), and a length greater than the length of panel 22 and gasket 24 such that it extends below panel 22 within the rear door of the vehicle 11 to provide a continuous, curved interior channel space adapted to receive a track for guiding the movement of the movable window 14 up and down within the rear door assembly. Channel support 20 also includes a rigid, L-shaped attachment flange 32 near its bottom end having an aperture 34 therein for receiving a securing screw for permanent attachment of the entire assembly to the door and vehicle. At the upper end of support 20 is a second L-shaped, rigid attachment flange or attachment 36 which extends outwardly generally in the plane of the panel 22. Flanges 32 and 36 are welded to the exterior of the rear wall 26. Flange 36 at the upper end also includes an aperture 38 for receiving a securing screw 50 for permanent attachment of the assembly in the vehicle.

As is best seen in FIGS. 5, 6, 12, and 12A, rigid attachment flange 36 also includes a pair of spaced, rectangular apertures 40 which receive a molded plastic locator member 42 molded from nylon or other durable resinous plastic material. Locator 42 includes a rectangular, upstanding tab 44 having beveled edges, a flange 46 which surrounds tab 44 and supports the member atop flange 36, and a pair of downwardly projecting retaining members 48 having enlarged surfaces forming shoulders 49 which catch beneath the edge of slightly larger apertures 40 to retain the locator in position. As explained below, locator 42 allows temporary placement and positioning of the upper end of assembly 10 in body or door 13 of vehicle 11 as shown in FIG. 12 until attachment and alignment of other trim members from other portions of the vehicle can be completed prior to final positioning and attachment with appropriate screws 50 received through apertures 34, 38 in attachment flanges 32, 36 respectively.

Figure 3:
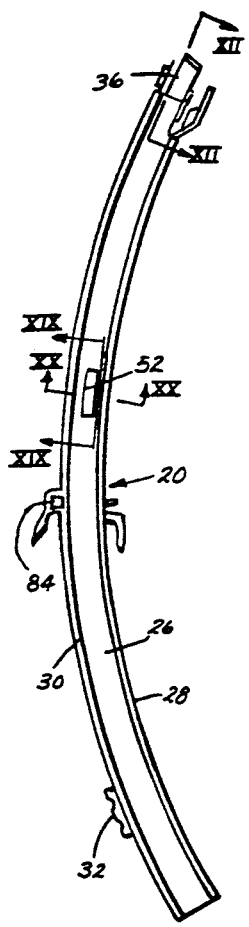
FIG. 3 is a front end elevation of the window panel assembly of FIGS. 1 and 2.
Figure 19:
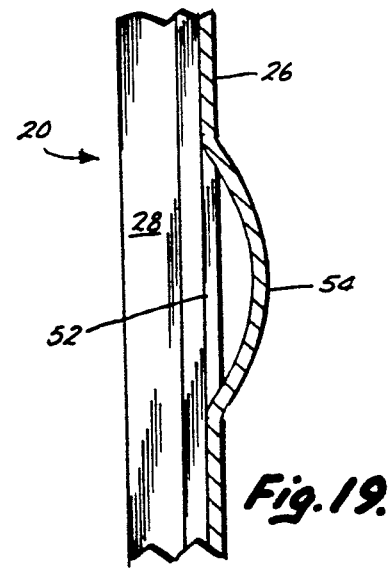
FIG. 19 is a fragmentary, sectional view of a portion of the channel support member of the panel assembly taken along Plane XIX—XIX of FIG. 3.

As shown in FIGS. 3, 19 and 20 support channel 20 also includes a rectangular, elongated aperture 52 which is positioned slightly off center in rear wall 26 toward the interior side wall 28 (FIGS. 3 and 20). Aperture 52 is preferably formed by lancing rear wall 26 and bending the material from the aperture area outwardly into a partially circular strip 54 spaced outwardly from the rear wall 26 as shown in FIG. 19. As explained below, when molding material is injected through aperture 52 from the inside of channel support 24, the material will strike the inside surface of strip 54, be deflected at approximately 90° from its original direction of travel and enter the mold cavity where it flows along the length of the exterior surface of the channel support toward the ends of that support to thoroughly and adequately cover the support exterior surface. The size of aperture 52 and distance at which strip 54 is spaced outwardly from the rear wall 26 is a matter of choice depending on the molding materials, the size of the structure to be formed, and the thickness of the molding material in the completed assembly. Preferably, for a panel assembly having dimensions A and B in FIG. 5 of approximately 18½ by 12¾ inches, aperture 52 is 25 millimeters long, approximately 4.5 millimeters wide while the outer surface of the strip 54 is spaced 4.19 millimeters from the rear surface of rear wall 26 at its farthest point. After molding, gasket 24 extends from opening 52 in and around strip 54 which is embedded therein to help retain the gasket, sheet and channel support together as an assembly.

Referring now to FIGS. 2, 4–6, and 12–18, molded gasket or casing 24 is preferably formed from a resinous polymeric material such as polyvinylchloride or reaction injection molded polyurethane and is shaped into a continuous, generally triangular, resilient member in a suitable mold apparatus. Gasket 24 includes a pair of spaced, elongated, resilient sealing flanges 60, 62 and adhering flanges 66, 68. Flanges 60, 62 extend outwardly on either side of the assembly and away from the peripheral edge of sheet 22 to define a channel recess 64 forming a general C-shape for the gasket in cross section. Flanges 66, 68 extend over both sides of the peripheral edge of sheet 22 and inwardly toward the center of the sheet a predetermined distance to envelope and encapsulate the sheet periphery and securely adhere to the glass surfaces and edge (FIGS. 2, 5, 14–16 and 18). Prior to molding, the peripheral portion of glass sheet 22 is preferably coated with a suitable primer to promote adhesion of the resinous moldable material thereto. A suitable primer is a water born urethane primer produced under product number DX-4A by Donnelly Corporation of Holland, Mich.

Figure 2:
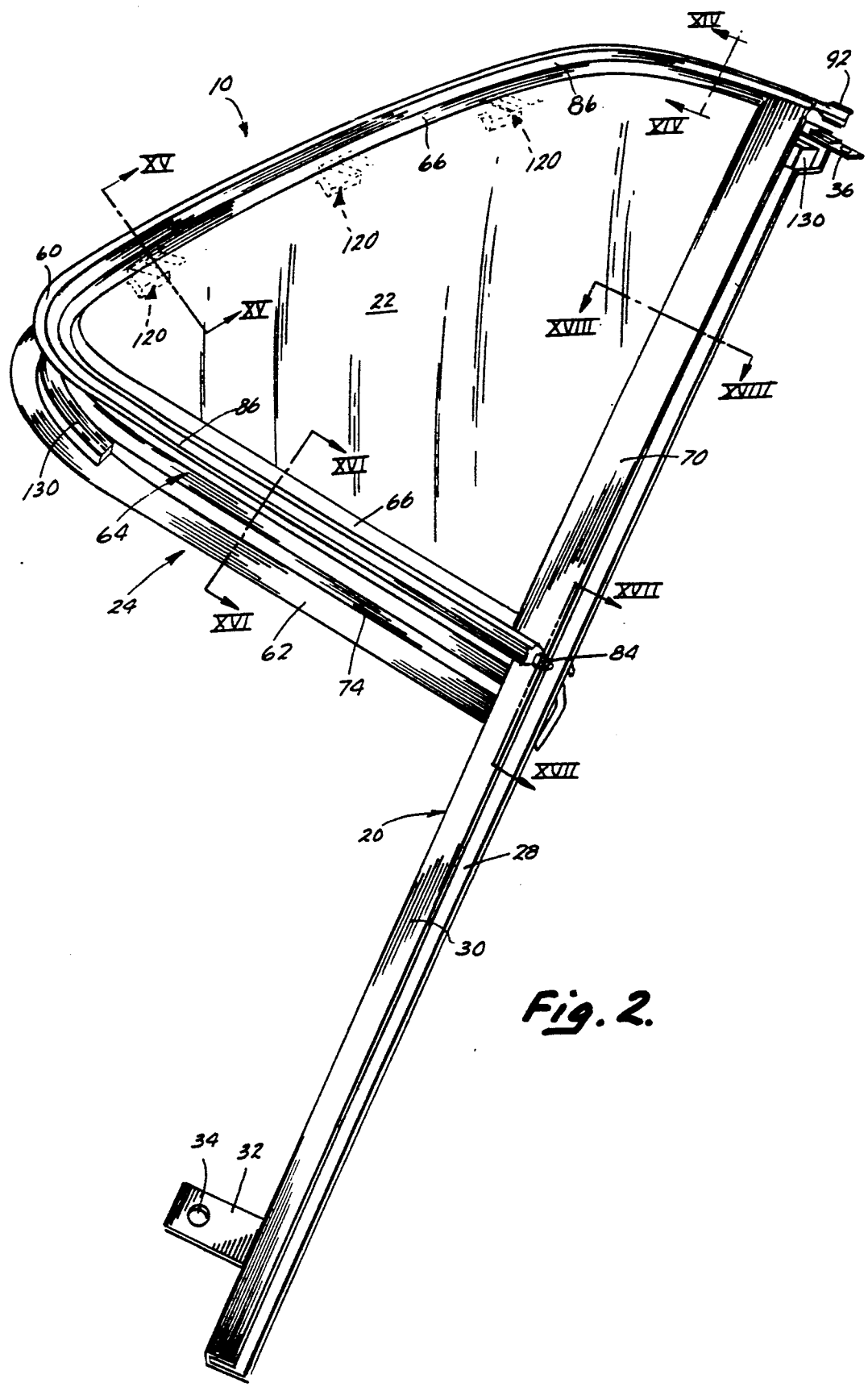
FIG. 2 is a perspective view of the window panel assembly shown in FIG. 1.
Figure 5:
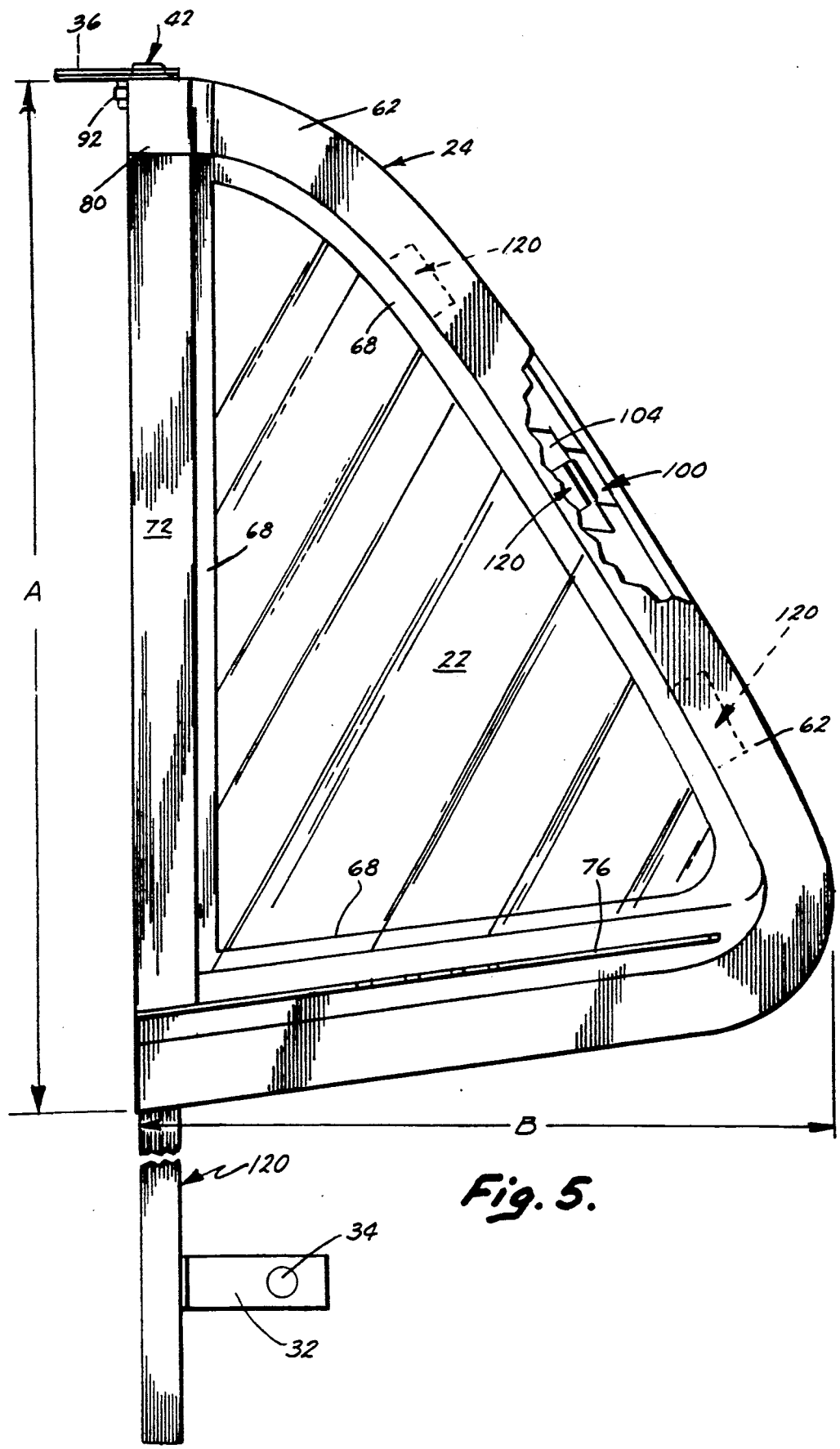
FIG. 5 is a plan view of the inside surface of the panel assembly of FIGS. 1-4.

In addition to encapsulating the peripheral edge of sheet 22, gasket 24 also covers, encapsulates and protects the complete outer surface of channel support 20 as is shown in FIGS. 2, 5 and 18. Gasket 24 includes a portion extending along the rear wall 26 of channel support 20 and layers 70, 72 which cover the complete exterior surfaces of side walls 28, 30 and terminate flush with the inner surfaces of side walls 28, 30. As explained below, the exterior surfaces of channel support 20 are preferably coated with two separate layers of primer material to enhance the adhesion of the resinous, molding material thereto after the channel support surfaces are cleaned of any oil and dirt by wiping with a suitable solvent such as methylethylketone. Preferably, a first primer layer of Donnelly DX-4B primer, an isocyanate terminated polymeric coating, is applied over the cleaned surface of the galvanized steel and allowed to dry followed by application of a layer of Donnelly DX-4A primer which is the same primer as used on glass sheet 22 as explained above. Donnelly DX-4B primer is also produced by Donnelly Corporation of Holland, Mich. These two primers are preferably used when the molding material is polyvinylchloride to promote a strong adherence of that material to the steel channel support. Other primers may be used with other resinous molding materials.

Figure 4:
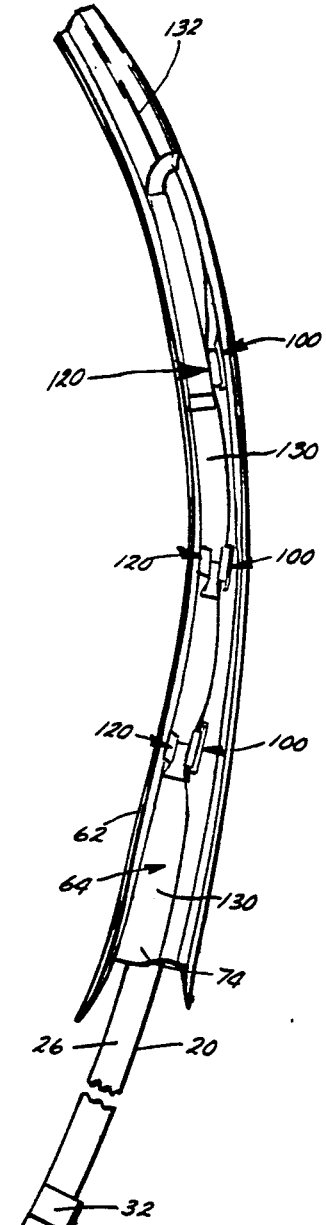
FIG. 4 is a rear end elevation of the panel assembly of FIGS. 1-3.
Figure 7:
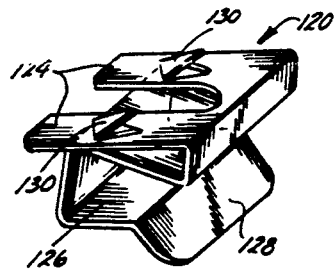
FIG. 7 is a perspective view of one of the fastener clips used in the panel assembly of FIGS. 1-6.
Figure 16:
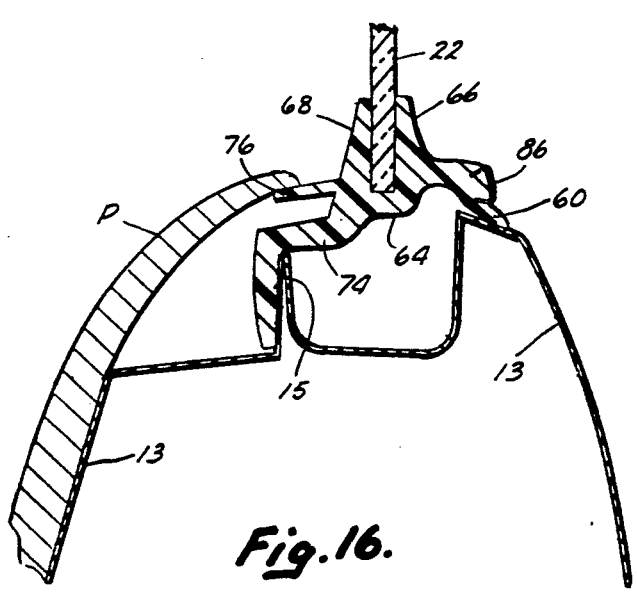
FIG. 16 is a fragmentary, sectional view of the panel assembly installed in a vehicle taken along Plane XVI—XVI of FIG. 2.

As part of the molding process, several additional elements are formed on gasket 24 integral with the remainder of the gasket. As shown in FIGS. 2, 4 and 16, the channel recess 64 of gasket 24 includes an elongated raised area 74 along the bottom of the sheet periphery which is adapted to engage a pinch weld flange 15 from vehicle 14 when assembly 10 is slid into position in the vehicle body. Raised area 74 urges the entire assembly upwardly to keep locator member 42 properly engaged with the aperture in the vehicle body 13 above the window opening as shown in FIG. 12. Raised area 74 extends generally from adjacent the rear surface 26 of channel support 20 to approximately the corner of sheet 22.

Figure 6:
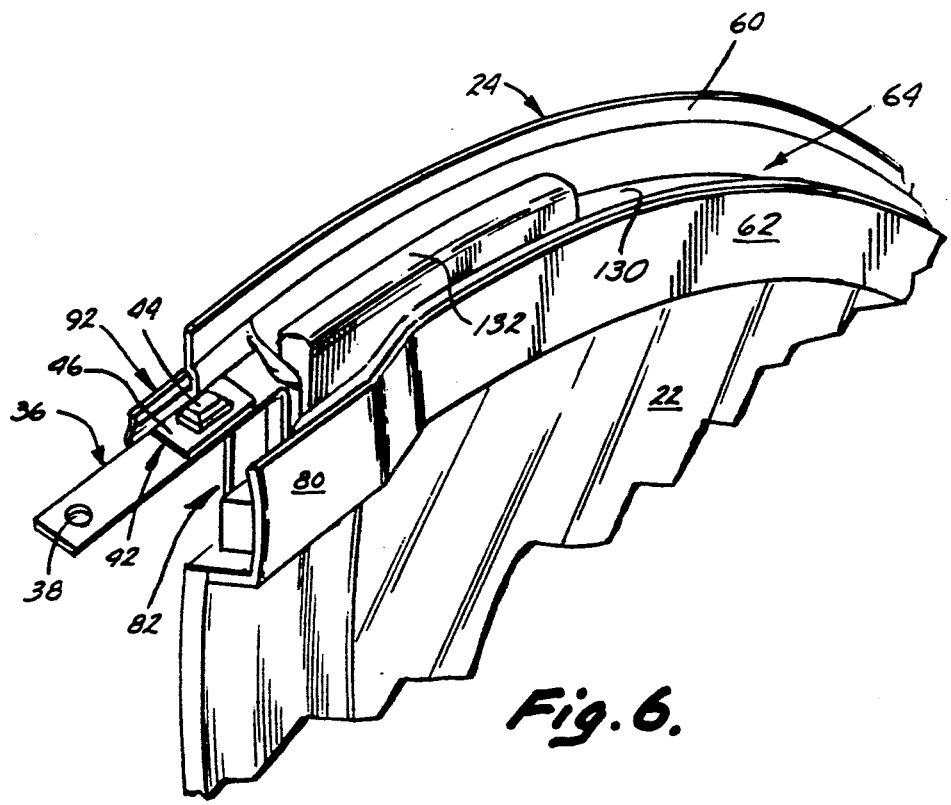
FIG. 6 is a fragmentary, perspective view of the top of the panel assembly of FIGS. 1-5.
Figure 17:
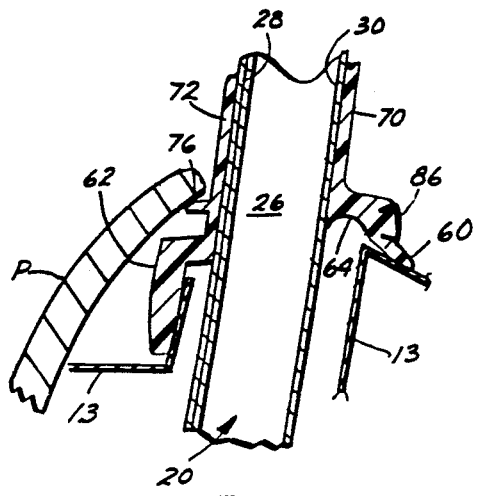
FIG. 17 is a fragmentary, sectional view of the panel assembly installed in a vehicle taken along Plane XVII—XVII of FIG. 2.
Figure 18:
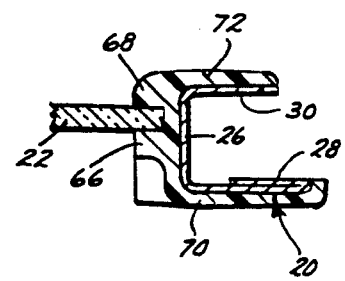
FIG. 18 is a fragmentary, sectional view of the panel assembly taken along Plane XVIII—XVIII of FIG. 2.

As shown in FIGS. 5, 16 and 17, a noise reduction rib 76 is molded on the inside surface of adhering flange 68 on gasket 24 to extend inwardly toward the interior of the vehicle for engagement with an interior trim panel P as shown in FIG. 16. Rib 76 engages the inside surface of the interior fabric on the trim panel, and stops wind noise and door noise from inside the hollow area of door 13 of vehicle 11 from entering the passenger compartment of the vehicle. The rib also closes off the door interior from being viewed by passengers in the vehicle. As shown in FIGS. 5 and 6, resilient interior flange 62 at the top of the panel assembly is also molded to extend outwardly at section 80 to form a widened glove area 82 for receiving a rubber channel weather strip from an adjacent portion of the vehicle assembly. Such a weather strip (not shown) is adapted to fit within the channel support 20 and extend over the top of the movable window glass 14. Widened glove area 82 provides an area in which the weather strip may be bent over and toward the movable window 14 without excessively stretching the resilient flange 80.

As shown in FIGS. 2 and 3, an extending, molded alignment projection 84 in the shape of a truncated pyramid is formed adjacent the end edge of side wall 28 at the end of gasket member 24 between flanges 60 and 66. Projection 84 is adapted to engage and extend into a decorative trim strip attached to the vehicle door adjacent to assembly 10 after the assembly 10 is mounted on the vehicle. Hence, projection 84 aligns the subsequently attached decorative trim with the window assembly and any trim thereon.

As shown in FIGS. 2 and 14–17, a continuous, decorative, stainless steel trim strip 86 may optionally be placed in the mold prior to formation of the panel assembly such that, upon molding, flanges 86, 90 will be embedded in the exterior surface of flange 60 as shown in FIGS. 14–17 to improve the appearance of the completed assembly. Alternately, other strips can be used in place of strip 86 such as plastic, coated metal or coated plastic strips of various types. At the upper end of assembly 10 as shown in FIGS. 2, 5, 6 and 11, trim strip 86 may include an integral tie plate or alignment member 92 which projects laterally outwardly of the assembly. Tie plate 92 has a central strip 94 formed as an extension of the outside surface of trim strip 86, and a pair of gull-wing like laterally extending flanges 96, 98 which are adapted to be received within an adjacent trim member (not shown) on another portion of the vehicle to properly align such additional trim with trim strip 86. Alternately, if no trim strip 86 is included in the assembly, a short, black finished, tie plate substantially as shown in FIG. 11 may be included for use in alignment with adjacent trim members. Such alignment improves the aesthetic appearance of the assembly with the remainder of the vehicle after installation.

As is shown best in FIGS. 2, 4, 5 and 15, gasket 24 also includes a series of three, spaced, fastener clip receiving pockets 100 which are positioned along and adjacent to the outermost edge of panel 22 at the rear of the assembly for receiving fastener clips 120 therein. Each spaced pocket 100 includes a narrow, generally rectilinear recess 102 extending generally parallel to the inner surface of sheet 22 between the sheet and the remainder of channel recess 64 in the gasket. Pocket recess 102 thus defines an upstanding flange 104 in channel recess 64 over which is fitted clip member 120 as explained hereinafter.

As is best seen in FIGS. 7–10 and 15, each fastener 120 is preferably a spring steel clip formed with a black zinc finish and including central flange 122, a pair of securing flanges 124 on one side of flange 122 and an attachment flange 126 on the opposite side of the central flange. The outer end of 128 of attachment flange 126 is bent outwardly away from central flange 122 for ease of attachment of the assembly within the vehicle when slid into place. In addition, retaining flanges 124 include outwardly extending, sharpened barbs 130 adapted to engage the inside surface of pocket 102 as shown in FIG. 15 when the clip is received in the pocket 100. Since retaining flanges 124 extend generally in the opposite direction from attachment flange 126, fastener 120 may be placed in pocket 100 by bending flanges 124 outwardly away from central flange 122 and sliding the free ends of flanges 124 toward the bottom of pocket recess 102. The backward slant of barbs 130 allows such insertion. However, should an attempt be made to withdraw fastener clip 120, the sharp ends of barbs 130 will dig into the opposite side of pocket recess 102 and prevent such withdrawal. Simultaneously, flange 126 is received in channel recess 64 of molded gasket 24 such that flange 126 and outwardly bent end portion 128 are available for sliding receipt over pinch well flange 15 of vehicle 14 as shown in FIG. 15. The resilient spring nature of clip 120 draws assembly 10 toward the interior of the vehicle and resilient flange 60 tightly into engagement with the body sheet metal 13 of vehicle 11 when flange 126 is engaged over the pinch weld flange 15 as shown in FIG. 15. Such engagement provides a tight water and weather seal and helps to reduce wind noise along the vehicle.

Figure 8:
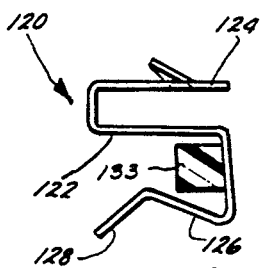
FIG. 8 is an end elevation of the fastener clip of FIG. 7.
Figure 9:
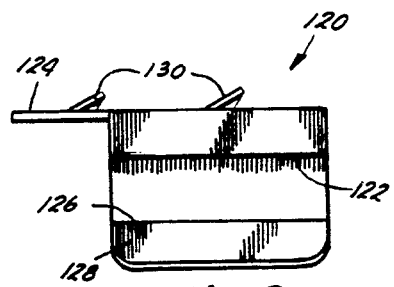
FIG. 9 is a top plan view of the fastener clip of FIGS. 7 and 8.
Figure 10:
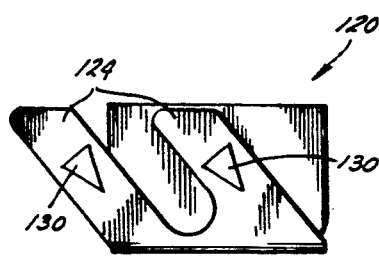
FIG. 10 is a rear elevation of the fastener clip of FIGS. 7-9.

As shown in FIGS. 2, 4, 6, 14 and 15, additional water and weather sealing is provided in the assembly by including separately formed, compressible, closed-cell foam strips 130 within channel recess 64 of gasket 24 along various portions thereof. A first foam strip 130 having a generally square cross-section, a contact adhesive layer thereon, and a preferred dimension of 12×12×560 millimeters is pressed in the bottom of channel recess 64 beginning at a position adjacent attachment flange 36 and extending continuously to a position slightly inside from the corner of sheet 22 as shown in FIG. 2. A separate, generally rectangular, short strip 132 of compressible foam having a preferred dimension of 4×25×60 millimeters is also adhered by a contact adhesive layer thereon in channel recess 64 at the upper end of the assembly such that it bends over and extends along one area or the channel recess aligned with the edge of sheet 22 as shown in FIG. 14. Strip 132 helps to block the area of the channel recess 64 at the top of the assembly and stops wind and sound from moving around the window to create noise beginning at such upper end or continuing along the extent of the molded gasket. Preferably, strips 130, 132 are obtained from Permacel, a Nitto Denko Company, of New Brunswick, N.J. Additional closed cell foam strips 133 of a dimension 6×6×50 millimeters may be laid within the channel area between flanges 122 and 126 of clips 120 (FIGS. 8 and 15). Such foam strips 133 at the clip locations additionally help to provide a water and weather seal and reduced wind noise in the completed assembly.

During manufacturing of panel assembly 10 of the present invention, channel support 20 is first cleaned with an appropriate solvent such as methylethylketone to remove any residual dirt and oil from the areas to be covered by gasket 24. Thereafter, two separate primer coatings are applied to the cleaned area, the first being Donnelly DX-4B primer as above for promoting adherence to the galvanized steel surface of the channel support. After the first coating has dried, the second primer layer, namely, Donnelly DX-4A as above, is applied over the first primer coating to promote adherence of the preferred polyvinylchloride molding material to the channel support.

Next, the various components of assembly 10 are loaded in a suitable mold apparatus. If a trim strip 86 or tie plate 92 is to be included, one or the other is placed in inverted position in a mold cavity portion formed in one mold portion. Sheet 22 is then inserted such that its peripheral edge extends into the mold cavity. The cavity outlines the entire edge of sheet 22 including that area of the edge which will be joined to channel support 20. Thereafter, channel support 20 is placed in the cavity at room temperature on the projecting end of a slide forming a portion of the lower mold portion. The extending nose of the slide is curved and configured to the shape of the inside of channel support 20 and receives the channel support thereover such that channel support 20 is suspended within the mold cavity after the slide is moved inwardly before closing the mold. The remainder of the cavity includes various recesses and projections to form the remainder of the gasket 24, including pockets 100. Raised area 74, flanges 60, 62, channel recess 64 and noise reduction rib 76 are also formed simultaneously in the same fashion due to predetermined configurations in the mold cavity.

After loading the lower mold portion, an upper mold portion is lowered into position to clamp sheet 22 and complete the definition of the mold cavity. Molding material such as polyvinylchloride or RIM urethane is then injected through aperture 52 in channel support 20 such that molding material passes through channel rear wall 26 at aperture 52 and against strip 54. Strip 54 redirects the molding material along the surface of rear wall 26 such that it flows outwardly toward the ends of channel support 20 to prevent formation of any visible seams or "knit" lines along the exposed surfaces of the channel support. Simultaneously, mold material is injected into the mold cavity on the opposite side of the mold apparatus from aperture 52. The streams of molding material flow along the cavity around the periphery of sheet 22 and meet at the corners between sheet 22 and channel support 20 where they are relatively unnoticeable. After molding, the cured or set up molding material which extends between strip 54 and rear wall 26 of channel support 20 helps retain gasket 24, sheet 22 and channel support 20 together.

The mold slide on which channel support 20 is mounted in the mold includes an aperture or bore adapted to receive heated fluid pumped therethrough to heat and maintain the slide at a desired temperature. Heat is thus transferred to channel support 20 when mounted on the slide such that the channel support is maintained at a high temperature, preferably about 170° F. during molding. The high temperature of the molding material, such as PVC, and the channel support, together with the resultant heating of the primer coatings previously applied to the channel support as described above, enhance adhesion of the molding material to the metal bar.

After curing and/or set up of the molding material, the upper mold portion is raised, the slide is withdrawn, and the molded assembly is removed from the mold cavity by polling it or "walking" it out of the mold.

After removal of panel assembly 10 from the mold apparatus, foam strip 130 is adhered within the channel recess 64, foam strip 132 is applied at the top of the assembly, and clips 120 are inserted in pockets 100 concurrently with additional shorter foam strips as described above. In addition, locator member 42 is fitted in aperture 40 and the panel unit is complete and ready for installation.

During vehicle installation, panel assembly 10 is first located in door 13 approximately adjacent the triangularly shaped window opening at the rear of the door with locator member 42 adjacent an aperture in the vehicle body portion as shown in FIGS. 12 and 13. The assembly is then slid rearwardly into the triangularly shaped opening such that raised area 74 engages pinch weld flange 15 forcing locator tab 44 upwardly into the vehicle body aperture. Assuming the assembly includes a trim strip 86 including tie member 92, adjacent trim members are aligned with and telescoped over tie member 92 and molded projection 84. The assembly is then secured in place with screws 50 received through openings 34, 38. The rearward sliding movement of the assembly into the window opening causes flanges 126, 128 of fastening clips 120 to engage pinch weld flange 15 with an interference fit as shown in FIG. 15 thereby pulling the window inwardly toward the vehicle interior and firmly engaging resilient sealing flange 60 with the outside vehicle body 13. Simultaneously, foam strips 130, 132 and 133 are compressed and engage portions of the vehicle body as shown in FIG. 14 thereby blocking wind travel along the channel recess 64 and reducing wind noise as well as sealing out water. Subsequently, after installation of interior panel P on the inside of the door, noise reduction rib 76 also facilitates reduced noise as well as sealing out water. Accordingly, after installation, weather and water sealing as well as the overall appearance of the assembly in the vehicle are improved while wind noise is reduced.

While several forms of the invention have been shown and described, other forms will now be apparent to those skilled in the art. The embodiments of the invention shown in the drawings and described herein are merely for illustrative purposes, and are not intended to limit the scope of the invention which is defined by the claims which follow.

The embodiments of the invention in which an exclusive property or privilege is claimed are defined as follows:

1. A panel assembly for vehicles comprising:
   an elongated support member having an outer surface;
   at least one attachment member for securing said assembly to a vehicle body;
   a panel-like sheet having a peripheral edge, one portion of said peripheral edge extending along said support member;
   a molded gasket extending around said peripheral edge of said sheet, encapsulating said peripheral sheet edge and said outer surface of said support member, and joining said sheet and said support member to form a panel unit;
   said gasket including at least one recessed pocket therein and a flange for engaging the vehicle body; and
   a fastener clip mounted in said pocket for engaging a portion of the vehicle when said assembly is installed therein to tightly secure said assembly to said vehicle whereby wind noise and water leakage are reduced.

2. The panel assembly of claim 1 wherein said gasket is generally C-shaped and further includes at least one elongated, flexible, resilient molded flange for engaging and sealing against the vehicle body and an elongated channel recess around said peripheral sheet edge for receiving a first portion of the vehicle body when said assembly is installed in a vehicle.

3. The panel assembly of claim 2 wherein said gasket includes a second extending, flexible, resilient molded flange for engaging another portion of the vehicle body spaced from the first portion.

4. The panel assembly of claim 3 wherein said recessed pocket is located adjacent said elongated channel recess intermediate said channel recess and said sheet.

5. The panel assembly of claim 4 wherein said gasket includes a plurality of said recessed pockets spaced along said peripheral sheet edge; one of said fastener clips being mounted in each of said pockets.

6. The panel assembly of claim 5 wherein said sheet is transparent and said assembly is a window assembly.

7. The panel assembly of claim 2 wherein said gasket includes a plurality of said recessed pockets spaced along said peripheral sheet edge; one of said fastener clips being mounted in each of said pockets.

8. The panel assembly of claim 2 wherein said gasket is molded from a resinous polymeric material selected from the group including polyvinyl chloride and reaction injection molded polyurethane.

9. The panel assembly of claim 2 wherein said support member is a rigid channel member having a channel shaped cross-section, a closed side and an open side; said one peripheral edge portion of said sheet extending along said closed side of said support member, said open side of said support member opening away from said sheet edge; said gasket extending around said outer surface of said rigid channel member to said open side.

10. The panel assembly of claim 9 wherein said assembly further includes a locator member projecting therefrom for engaging a portion of the vehicle to locate and position the vehicle portion with respect to said assembly.

11. The panel assembly of claim 10 wherein said gasket further includes a raised area within said elongated channel recess, said raised area adapted to engage another portion of the vehicle to maintain said locator member in engagement with the vehicle portion.

12. The panel assembly of claim 11 wherein said gasket further includes at least one compressible foam strip secured within said elongated channel recess to enhance weather sealing against the vehicle and to reduce wind noise when said assembly is installed on a vehicle.

13. The panel assembly of claim 12 wherein said gasket further includes an elongated flange on the inside surface of said gasket for engaging an interior trim panel on a vehicle to reduce noise adjacent the inside surface of said assembly when installed in a vehicle.

14. The panel assembly of claim 2 including a decorative trim member secured to the outside surface of said gasket; said trim member including means extending outwardly from an edge of said assembly for locating and positioning another trim member adjacent to said assembly.

15. The panel assembly of claim 2 wherein said gasket further includes at least one compressible foam strip secured within said elongated channel recess to enhance weather sealing against the vehicle and to reduce wind noise when said assembly is installed on a vehicle.

16. The panel assembly of claim 1 wherein said assembly further includes a locator member projecting therefrom for engaging a portion of the vehicle to locate and position the vehicle portion with respect to said assembly.

17. The panel assembly of claim 16 wherein said locator member is included on said attachment member; said attachment member including a rigid flange extending from said support member.

18. The panel assembly of claim 1 wherein said gasket further includes an elongated flange on the inside surface of said gasket for engaging an interior trim panel on a vehicle to reduce noise adjacent the inside surface of said assembly when installed in a vehicle.

19. The panel assembly of claim 1 wherein said clip includes a pair of resilient, bendable spring flanges, one of said flanges being received in said recessed pocket, the other of said flanges being spaced from said one flange and defining a channel for receiving a portion of the vehicle when said assembly is installed.

20. The panel assembly of claim 19 wherein said fastener clip includes a central body member, said flanges being spaced from said central body member and extending in opposite directions to form oppositely opening channels, said one flange including at least one barb thereon for engaging said gasket and retaining said clip in said pocket.

21. A panel assembly for vehicles comprising:

an elongated, rigid support member having an outer surface, a channel shaped cross-section, a closed side and an open side;

a panel-like sheet having a peripheral edge, one portion of said peripheral edge extending along said support member, said open side of said support member opening away from said sheet edge;

a molded gasket extending around said peripheral edge of said sheet, encapsulating said peripheral sheet edge and said outer surface of said support member, and joining said sheet and support member to form a panel unit; said gasket including at least one recessed pocket therein; and clip means mounted in said pocket for engaging a portion of the vehicle when said assembly is installed therein to tightly secure said assembly to said vehicle whereby wind noise and water leakage are reduced.

22. The panel assembly of claim 21 wherein said clip means includes a fastener clip having a pair of resilient, bendable spring flanges, one of said flanges being received in said recessed pocket, the other of said flanges being spaced from said one flange and defining a channel for receiving a portion of the vehicle when said assembly is installed.

23. The panel assembly of claim 22 wherein said fastener clip includes a central body member, said flanges being spaced from said central body member and extending in opposite directions to form oppositely opening channels, said one flange including at least one barb thereon for engaging said gasket and retaining said clip in said pocket.

24. The panel assembly of claim 21 wherein said gasket further includes at least one elongated, flexible, resilient molded flange for engaging and sealing against a first portion of the vehicle body when said assembly is installed.

25. The panel assembly of claim 24 wherein said gasket further includes a second elongated, flexible, resilient molded flange for engaging another portion of the vehicle spaced from the first portion; said first and second flexible, resilient flanges defining an elongated channel recess extending around said peripheral edge of said sheet for receiving the vehicle body when installed.

26. The panel assembly of claim 25 wherein said gasket includes a plurality of said recessed pockets spaced along said peripheral sheet edge; one of said fastener clips being mounted in each of said pockets.

27. The panel assembly of claim 26 wherein said sheet is transparent and said assembly is a window assembly; said gasket being molded from a resinous polymeric material selected from the group including polyvinyl chloride and reaction injection molded polyurethane.

28. The panel assembly of claim 25 wherein said gasket further includes at least one compressible foam strip secured within said elongated channel recess to enhance weather sealing against the vehicle and to reduce wind noise when said assembly is installed on a vehicle.

29. The panel assembly of claim 21 wherein said assembly further includes a locator member projecting therefrom for engaging a portion of the vehicle to locate and position the vehicle portion with respect to said assembly.

30. The panel assembly of claim 29 wherein said gasket further includes a raised area, said raised area adapted to engage another portion of the vehicle to maintain said locator member in engagement with the vehicle portion.

31. The panel assembly of claim 30 wherein said support member includes an attachment member for securing said assembly to a vehicle body; said locator member being included on said attachment member; said attachment member including a rigid flange extending from said support member.

32. The panel assembly of claim 21 wherein said gasket further includes an elongated flange on the inside surface of said gasket for engaging an interior trim panel on a vehicle to reduce noise adjacent the inside surface of said assembly when installed in a vehicle.

33. The panel assembly of claim 21 including a decorative trim member secured to the outside surface of said gasket; said trim member including means extending outwardly from an edge of said assembly for locating and positioning another trim member adjacent to said assembly.

34. A panel assembly for vehicles comprising:
an elongated support member having an outer surface;
at least one attachment member for securing said assembly to a vehicle body;
a panel-like sheet having a peripheral edge, one portion of said peripheral edge extending along said support member;
a molded gasket extending around said peripheral edge of said sheet, encapsulating said peripheral sheet edge and said outer surface of said support member, and joining said sheet and said support member to form a panel unit; and
a locator member projecting from said assembly for engaging another portion of the vehicle to locate and position the other vehicle portion with respect to said assembly.

35. The panel assembly of claim 34 wherein said locator member is included on said attachment member; said attachment member including a rigid flange extending from said support member.

36. The panel assembly of claim 35 wherein said locator member is an upwardly extending tab on said rigid flange, said rigid flange being located at the top of said assembly; said gasket including a raised area at the bottom of said assembly for engaging another portion of the vehicle to maintain said tab in engagement with the vehicle portion.

37. The panel assembly of claim 34 including a molded projection extending outwardly from an edge of said gasket to locate and position an adjacent trim member when said assembly is installed on a vehicle.

38. A panel assembly for vehicles comprising:
an elongated support member having an outer surface, an opening therethrough, and a spaced portion positioned outwardly from said outer surface adjacent said opening:
at least one attachment member for securing said assembly to a vehicle body;
a panel-like sheet having a peripheral edge, one portion of said peripheral edge extending along said support member;
a molded gasket extending around said peripheral edge of said sheet, encapsulating said peripheral sheet edge and said outer surface of said support member, and joining said sheet and said support member to form a panel unit;
said gasket extending from said opening around said spaced portion which is embedded within said gasket to help secure said support member, sheet and molded gasket together.

* * * * *

UNITED STATES PATENT AND TRADEMARK OFFICE
CERTIFICATE OF CORRECTION

PATENT NO. : 5,139,307

DATED : August 18, 1992

INVENTOR(S) : Roger L. Koops and Daniel R. Athey

It is certified that error appears in the above-identified patent and that said Letters Patent is hereby corrected as shown below:

Column 8, line 19;
"along one" should be --along the--.

Column 8, line 19;
"area or" should be --area of--.

Signed and Sealed this

Twenty-sixth Day of October, 1993

Attest:

BRUCE LEHMAN

Attesting Officer        Commissioner of Patents and Trademarks